J. W. NORCROSS.
Axle-Bearing for Tackle-Blocks.

No. 221,469. Patented Nov. 11, 1879.

WITNESSES:
Joseph A. Miller Jr.
William L. Coop.

INVENTOR:
Joseph W. Norcross
by Joseph A. Miller
Attorney

UNITED STATES PATENT OFFICE.

JOSEPH W. NORCROSS, OF BOSTON, MASSACHUSETTS.

IMPROVEMENT IN AXLE-BEARINGS FOR TACKLE-BLOCKS.

Specification forming part of Letters Patent No. 221,469, dated November 11, 1879; application filed March 25, 1879.

*To all whom it may concern:*

Be it known that I, JOSEPH W. NORCROSS, of the city of Boston, county of Suffolk, and State of Massachusetts, have invented a new and useful Improvement in Axle-Bearings for Tackle-Blocks; and I hereby declare that the following is a full, clear, and exact description of the same, reference being had to the accompanying drawings, forming part of this specification.

This invention has reference to improvements in the axle-bearings of tackle-blocks; and it consists in the peculiar arrangement by which the wear of the axle is confined to an inserted block of specially-prepared metal and the axle is lubricated, as will be more fully set forth hereinafter.

Figure 1:
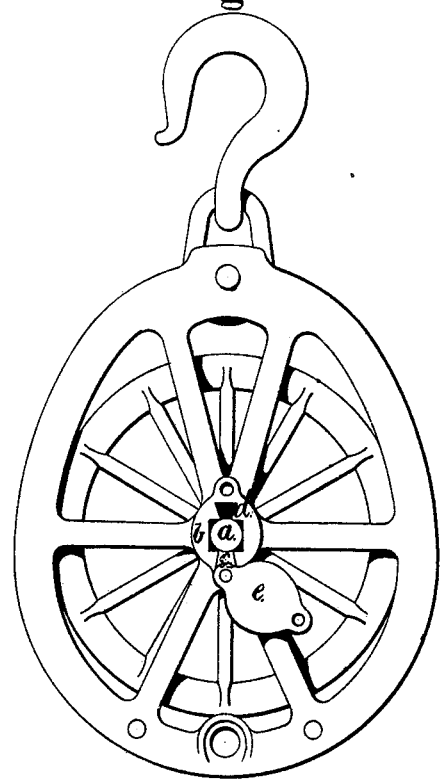
Figure 2:
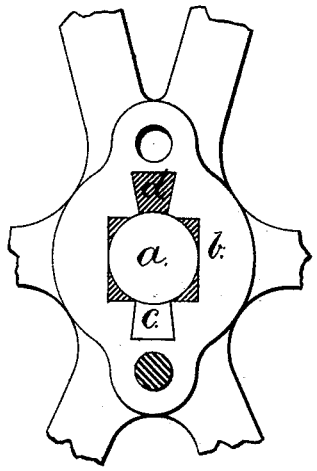
Figure 3:
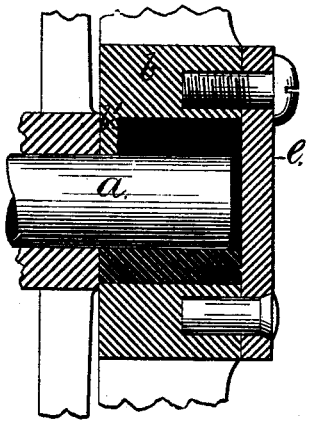
Figure 4:
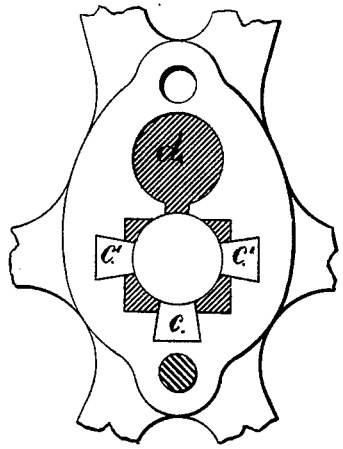

Figure 1 is a view of a tackle-block, showing the axle supported on an inserted block and turning in a square hole of such dimensions that the axle touches the sides of the square hole, the corners being filled with a lubricating material, and also a chamber above the axle containing lubricating material. Fig. 2 is an enlarged view of the axle and bearing. Fig. 3 is a sectional view, showing the axle resting on the inserted block, the lubricating material and the cap closing the opening. Fig. 4 is a view of an axle supported on three inserted blocks placed within the frame and surrounded by a lubricating material placed above the axle.

The object of this invention is, first, to provide renewable thrust or bearing blocks, on which the axle turns; secondly, to prevent the heating of a shaft or axle by allowing the same to bear only at certain points, and making the rest of the hole in which it turns larger, such as a square hole with a bearing at the four sides; thirdly, to lubricate the axle-bearing by placing a hard lubricant—such as plumbago and tallow, metalline and tallow, or similar lubricating matter—into the spaces between the bearing-points; and, fourthly, in providing a reservoir above the shaft or axle cast into the bearing-block, and connected with the axle-box by opening and filling the same with some hard lubricant that will melt when the axle commences to heat; or the opening between the axle-bearing and the reservoir may be closed with some material that will melt at or above, say, 100° Fahrenheit, such as paraffine and bismuth, so that when the axle is heated by wear after the lubricant surrounding the axle is used up, then the lubricant in the reservoir will be released by the heat generated and a new supply of lubricant delivered.

In the drawings, $a$ represents the axle. $b$ is the axle-bearing, in which $b'$ is a shoulder partially surrounding the axle and fitting the same. The rest of the axle-bearing is a square hole, in which the axle bears against the four sides, leaving an open space in the four corners, which is to contain the lubricating material.

$c$ is a thrust-block, made of steel or other material best adapted to resist the wear of the axle.

If desired, the square hole in which the axle turns may be made larger than the diameter of the axle, and three thrust-blocks may be inserted, as is shown in Fig. 4, and thus a larger quantity of lubricating material be provided.

$d$ is a reservoir, located above the axle, containing a lubricant, preferably such lubricant as is in a plastic condition at ordinary temperatures, but which will melt at a temperature, above say, 100° Fahrenheit; or the connection between the axle-bearing and the reservoir may be plugged with some material that will melt when the axle becomes heated above the temperature at which the plug will melt, and so open the aperture and allow the lubricant to reach the bearings of the axle.

The safety reservoir may be connected with any kind of axle or shaft bearing, and when plugged with bismuth or a similar material, when other lubrication fails and the shaft becomes heated the plug will melt and the bearing be saved from cutting and overheating. The safety reservoir may be of any desired form or size.

$e$ is a cap secured to the axle-bearings to close the opening. It is hinged at one end, and secured by a screw at the other end, so that it can be readily opened and the axle provided with the lubricant, or the new bearing-block $c$ inserted therein.

Having thus described my invention, I claim as new and desire to secure by Letters Patent—

1. In tackle-blocks, the axle-bearing $b$, provided on its inner end with a shoulder, $b'$, partially surrounding the axle $a$ and fitting the same, substantially as and for the purpose described.

2. In a tackle-block, the combination, with the sheave-axle, of a bearing consisting of a collar fitting the axle, a square opening, each side of which is of a length equal to the diameter of the axle, and provided with a reservoir containing a lubricant and placed above the axle, substantially as and for the purpose set forth.

3. The combination, with the axle $a$ and bearing $b$, provided with the collar $b'$, and the thrust-block $c$, (one or more of them,) secured in the frame, as described, of the chamber $d$ and spaces surrounding the axle arranged to contain lubricating material, substantially as and for the purpose set forth.

In witness whereof I have hereunto affixed my name.

JOSEPH W. NORCROSS.

Witnesses:
JOSEPH A. MILLER,
JOSEPH A. MILLER, Jr.